United States Patent
Zhang et al.

(10) Patent No.: US 12,043,586 B2
(45) Date of Patent: Jul. 23, 2024

(54) SPECIAL CONTROLLED-RELEASE MICROBIAL FERTILIZER FOR PEANUTS IN CONTINUOUS CROPPING FIELD AND PREPARATION METHOD THEREOF

(71) Applicant: BIOTECHNOLOGY RESEARCH CENTER, SHANDONG ACADEMY OF AGRICULTURAL SCIENCES, Shandong (CN)

(72) Inventors: Jialei Zhang, Shandong (CN); Feng Guo, Shandong (CN); Shubo Wan, Shandong (CN); Xinguo Li, Shandong (CN); Gao Chen, Shandong (CN); Zheng Zhang, Shandong (CN); Jianguo Wang, Shandong (CN); Chaohui Tang, Shandong (CN); Sha Yang, Shandong (CN); Zhenying Peng, Shandong (CN); Jingjing Meng, Shandong (CN)

(73) Assignee: BIOTECHNOLOGY RESEARCH CENTER, SHANDONG ACADEMY OF AGRICULTURAL SCIENCES, Jinan (CN)

( * ) Notice: Subject to any disclaimer, the term of this patent is extended or adjusted under 35 U.S.C. 154(b) by 695 days.

(21) Appl. No.: 17/257,332

(22) PCT Filed: Jul. 20, 2020

(86) PCT No.: PCT/CN2020/102904
§ 371 (c)(1),
(2) Date: Dec. 31, 2020

(87) PCT Pub. No.: WO2021/232575
PCT Pub. Date: Nov. 25, 2021

(65) Prior Publication Data
US 2022/0127203 A1    Apr. 28, 2022

(30) Foreign Application Priority Data
May 21, 2020 (CN) .......................... 202010433322.0

(51) Int. Cl.
*C05G 1/00* (2006.01)
*C05C 3/00* (2006.01)
*C05C 5/00* (2006.01)
*C05C 5/04* (2006.01)
*C05C 9/00* (2006.01)
*C05C 9/02* (2006.01)
*C05D 5/00* (2006.01)
*C05D 9/02* (2006.01)
*C05F 11/02* (2006.01)
*C05F 11/08* (2006.01)
*C05G 3/40* (2020.01)
*C05G 5/35* (2020.01)

(52) U.S. Cl.
CPC ................ *C05G 1/00* (2013.01); *C05C 3/005* (2013.01); *C05C 5/005* (2013.01); *C05C 5/04* (2013.01); *C05C 9/005* (2013.01); *C05C 9/02* (2013.01); *C05D 5/00* (2013.01); *C05D 9/02* (2013.01); *C05F 11/02* (2013.01); *C05F 11/08* (2013.01); *C05G 3/40* (2020.02); *C05G 5/35* (2020.02)

(58) Field of Classification Search
CPC ... C05G 1/00; C05G 3/40; C05G 5/35; C05G 3/00; C05G 5/30; C05C 3/005; C05C 5/005; C05C 5/04; C05C 9/005; C05C 9/02; C05C 3/00; C05C 11/00; C05D 5/00; C05D 9/02; C05F 11/02; C05F 11/08; C05F 11/00
See application file for complete search history.

(56) References Cited

FOREIGN PATENT DOCUMENTS

| CN | 103193546 A | * | 7/2013 |
|----|-------------|---|--------|
| CN | 106008117 A |   | 10/2016 |
| CN | 107382460 A |   | 11/2017 |
| CN | 111377773 A |   | 7/2020 |
| CN | 106008117 B |   | 8/2020 |

* cited by examiner

*Primary Examiner* — Jennifer A Smith
(74) *Attorney, Agent, or Firm* — Porus IP LLC

(57) ABSTRACT

The invention relates to the technical field of agricultural planting, in particular to a special controlled-release microbial fertilizer for peanuts in a continuous cropping field and a preparation method thereof. The fabric comprises an outer layer, a middle layer and an inner layer. Through a three-layer structure, the controlled-release fertilizer prepared by the disclosure can realize the fertilizer efficiency period of 50-60 days, and achieves the purpose of twice releases.

3 Claims, No Drawings

SPECIAL CONTROLLED-RELEASE MICROBIAL FERTILIZER FOR PEANUTS IN CONTINUOUS CROPPING FIELD AND PREPARATION METHOD THEREOF

TECHNICAL FIELD

The disclosure relates to the technical field of agriculture planting, particularly to a special controlled-release microbial fertilizer for peanuts in a continuous cropping field and a preparation method thereof.

BACKGROUND

With the enlargement of peanut areas in China, the continuous cropping area has been rapidly increased, and reaches more than 4 million mu per year only in Shandong. The researches show that the peanut yield can be reduced by more than 10% when in continuous cropping for one year and 15-20% when in continuous cropping for two years. Allelochemicals in peanut root exudates with autotoxicity, such as cinnamic acid, lauric acid, myristic acid, palmitic acid, oleic acid, stearic acid, 2,4-di-tert-butylphenol, 2,6-di-tert-butylphenol, phthalic acid, p-hydroxybenzoic acid and 2,4-di-tolyl dldehyde, lead to reduction in nutrition synthesis and absorption capability mainly through the damage to the cell membrane, destruction of the cell structure and inhibition of the root growth, root activity and invertase activity. Imbalance of soil and rhizosphere microbial population (the number of fungi is increased significantly, the numbers of bacteria and actinomycetes are decreased significantly), decrease of soil enzyme activity decreased (soil urease, soil invertase and soil alkaline phosphatase activities, etc.), deficiency of soil nutrient elements (phosphorus, potassium, calcium and other trace elements) and exacerbation of disease and insect pests (root knot nematode, stem rot, damping off and other soil borne diseases and insect pests) are main reasons that continuous cropping obstacle occurs.

There are a variety of microbial fertilizer products on the market, many of which can effectively alleviate the adverse effects of continuous cropping on yield and quality of peanuts. However, there was no controlled-release microbial fertilizer for improving peanut continuous cropping field.

SUMMARY

Aiming at decreased yield and reduced production of peanuts caused by continuous cropping in the prior art, the disclosure provides a special controlled-release microbial fertilizer for peanuts in a continuous cropping field.

The disclosure also provides a method for preparing a special controlled-release microbial fertilizer for peanuts in a continuous cropping field.

In order to realize the above objective, the disclosure adopts the following technical solution:

Provided a special controlled-release microbial fertilizer for peanuts in a continuous cropping field, comprising an outer layer, a middle layer and an inner layer.

The inner layer consists of active bacteria, an inorganic matters and additives, wherein the variety and contents of active bacteria are respectively as follows: 200-300 million/g of *Bacillus subtilis*, 100-200 million/g of *Bacillus thurigniensis*, 50-100 million/g of *Aspergillus niger*, and 50-100 million/g of streptomycete; the variety and contents of inorganic matters are respectively as follows: 5-8 parts of calcium nitrate, 1-3 parts of magnesium sulfate, 1-3 parts of zinc sulfate 35, 1-3 parts of borax, 0.5-1 part of ammonium molybdate and 1-3 parts of ferrous sulfate; 10-15 parts of sodium carboxymethyl starch and 10-20 parts of modified starch.

In the inner layer, the contents of additives are respectively as follows: 60-80 parts of fulvic acid, 15-20 parts of alginic acid and 10-12 parts of amino acid.

The middle layer is composed of 30-50 parts of urea formaldehyde powder, 15-20 parts of polyethylene glycol and 30-40 parts of natto powder.

The components and contents of the outer layer are the same as those of the compositions in the inner layer.

The outer layer also contains 10-12 parts of rice husk carbon and 8-10 parts of cellulose.

The relative molecular weight of the cellulose is 80000-100000.

A method for preparing the special controlled-release microbial fertilizer for peanuts in a continuous cropping field, comprising the following steps:

(1) adding water whose weight is three times those of sodium carboxymethyl starch and modified starch into sodium carboxymethyl starch and modified starch in the inner layer, heating to 70-80° C., evenly stirring, adding an inorganic matter, evenly stirring, cooling to room temperature, adding active bacteria and an additive, pelletizing, and drying to obtain a core inner layer; and (2) evenly mixing urea formaldehyde powder, polyethylene glycol and ⅓ weight of natto powder in the middle layer, heating to 95° C., stirring for 1 h, then adding the remaining natto powder, evenly stirring, then carrying out ultrasonic treatment for 20 min, cooling to 38° C., spraying the treated middle layer mixed solution on the surface of the core inner layer, and rapidly rotating the core inner layer in the process of spraying to obtain double-layer particles; and (3) adding water whose weight is twice times those of sodium carboxymethyl starch and modified starch in the outer layer, heating to 70-80° C., evenly stirring, adding the inorganic matter, rice husk carbon and cellulose, evenly stirring, cooling to room temperature, adding the active bacteria and the additive, spraying the above mixed solution on the surface of the double-layer particles prepared in step (2) at room temperature, and then drying the prepared particles under low temperature.

Through a three-layer structure, the controlled-release fertilizer prepared by the disclosure can realize the fertilizer efficiency period of 50-60 days, and achieves the purpose of twice releases.

Lipopeptide antibiotics produced by *Bacillus subtilis* are the most important antibacterial substances, which can effectively inhibit root rot and damping off; *Bacillus thuringiensis* can kill pests including root knot nematodes, and has specific toxic activity to *lepidoptera* and other arthropod larvae (*Pieris rapae, Helicoverpa armigera*, and *Agrotis tigris*); *Aspergillus niger* and *Streptomyces niger* can improve the activities of soil urease, soil invertase and alkaline phosphatase, increase the contents of total nitrogen, total phosphorus, total potassium, alkali hydrolyzable nitrogen, available phosphorus, available potassium and organic matters in the soil, improve soil conditions, alleviate continuous cropping obstacles, and improve the yield and quality of peanuts in the continuous cropping field.

Fulvic acid, alginic acid and chitooligosaccharide can improve soil microenvironment, promote the growth of beneficial bacteria, and provide amino acids, polysaccharides and other physiological active substances needed by microbial flora and peanut growth.

Calcium nitrate, magnesium sulfate, zinc sulfate, borax, ammonium molybdate and ferrous sulfate fully supplement trace elements needed for peanut growth.

The disclosure has the beneficial effects:

(1) After being combined with conventional organic fertilizer, the microbial fertilizer prepared by the disclosure can increase the total amount of microorganisms in the soil, increases the quantity and variety of bacteria, fungi and actinomycetes, improves the continuous cropping obstacles of peanuts, and can effectively prevent and control soil borne fungi, has the dual effects of protection and treatment, reduces the human and material resources consumption of intensive cultivation of soil, reduces the transpiration of soil and improves the soil use efficiency and productivity, and improve the yield and quality of peanuts.

(2) Rice husk carbon and cellulose are added into the outer layer of the disclosure. After fertilization, the fertilizer can provide an oxygen transport effect for partial biological bacteria. On the other hand, the fertilizer can provide a carbon source during the fermentation of biological bacteria. In the process of decomposing the outer layer, a barrier can be formed for the inner layer within a certain period of time to achieve the function of water and fertilizer conservation.

(3) The middle layer provided by the disclosure can form a cross-linked network structure, which has good porosity, can effectively cover the inner layer structure, has water absorption and moisture retention and slow release and controlled release, realizes the gradual release of the inner layer, has high fertilizer utilization rate, maximizes the effect of microbial agents, and is conducive to large-scale promotion.

DESCRIPTION OF THE EMBODIMENTS

Next, the technical solution of the disclosure will be explained and illustrated through embodiments.

The natto powder and active bacteria used in the disclosure are available on the market.

Example 1

A special controlled-release microbial fertilizer for peanuts in a continuous cropping field:

The inner layer: 200 million/g of *Bacillus subtilis*, 150 million/g of *bacillus thurigniensis*, 80 million/g of *Aspergillus niger*, and 80 million/g of streptomycete; 8 kg of calcium nitrate, 2 kg of magnesium sulfate, 3 kg of zinc sulfate, 1 kg of borax, 1 part of ammonium molybdate and 2 kg of ferrous sulfate; 12 kg of sodium carboxymethyl starch and 15 kg of modified starch.

In the inner layer, the contents of additives are respectively as follows: 60 kg of fulvic acid, 20 kg of alginic acid and 10 kg of amino acid.

The middle layer is composed of 30 kg of urea formaldehyde powder, 18 kg of polyethylene glycol and 32 kg of natto powder.

The outer layer: components contained in the inner layer, 10 kg of rice husk carbon and 8 kg of cellulose (relative molecular weight is 80000-100000).

The preparation method is as follows:

(1) adding water whose weight is three times those of sodium carboxymethyl starch and modified starch into sodium carboxymethyl starch and modified starch in the inner layer, heating to 70-80° C., evenly stirring, then adding an inorganic matter, evenly stirring, cooling to room temperature, adding active bacteria and an additive, pelletizing, and drying to obtain a core inner layer;

(2) evenly mixing urea formaldehyde powder, polyethylene glycol and ⅓ weight of natto powder in the middle layer, heating to 95° C., stirring for 1 h, then adding the remaining natto powder, evenly stirring, then carrying out ultrasonic treatment for 20 min, cooling to 38° C., spraying the treated middle layer mixed solution on the surface of the core inner layer, rapidly rotating the core inner layer in the process of spraying to obtain double-layer particles; and (3) adding water whose weight is twice those of sodium carboxymethyl starch and modified starch into sodium carboxymethyl starch and modified starch in the inner layer, heating to 70-80° C., evenly stirring, adding the inorganic matter, rice husk carbon and cellulose, evenly stirring, cooling to room temperature, adding the active bacteria and the additive, spraying the above mixed solution on the surface of the double-layer particles prepared in step (2) at room temperature, and then drying the prepared particles under low temperature.

Example 2

A special controlled-release microbial fertilizer for peanuts in a continuous cropping field:

The inner layer: 300 million/g of *Bacillus subtilis*, 100 million/g of *bacillus thurigniensis*, 100 million/g of *Aspergillus niger*, and 50 million/g of streptomycete; 5 kg of calcium nitrate, 1 kg of magnesium sulfate, 2 kg of zinc sulfate, 3 kg of borax, 0.5 kg of ammonium molybdate and 1 kg of ferrous sulfate; 15 kg of sodium carboxymethyl starch and 10 kg of modified starch.

In the inner layer, the contents of additives are respectively as follows: 80 kg of fulvic acid, 18 kg of alginic acid and 10 kg of amino acid.

The middle layer is composed of 35 kg of urea formaldehyde powder, 20 kg of polyethylene glycol and 40 kg of natto powder.

The outer layer: components contained in the inner layer, 12 kg of rice husk carbon and 9 kg of cellulose (relative molecular weight is 80000-100000).

The preparation method is the same as that in example 1.

Example 3

A special controlled-release microbial fertilizer for peanuts in a continuous cropping field:

The inner layer: 250 million/g of *Bacillus subtilis*, 100 million/g of *bacillus thurigniensis*, 50 million/g of *Aspergillus niger*, and 80 million/g of streptomycete; 6 kg of calcium nitrate, 3 kg of magnesium sulfate, 1 kg of zinc sulfate, 2 kg of borax, 0.5-1 kg of ammonium molybdate and 1-3 kg of ferrous sulfate; 12 kg of sodium carboxymethyl starch and 18 kg of modified starch.

In the inner layer, the contents of additives are respectively as follows: 70 kg of fulvic acid, 15 kg of alginic acid and 12 kg of amino acid.

The middle layer is composed of 50 kg of urea formaldehyde powder, 15 kg of polyethylene glycol and 40 kg of natto powder.

The outer layer: components contained in the inner layer, 10 kg of rice husk carbon and 9 kg of cellulose (relative molecular weight is 80000-100000).

The preparation method is the same as that in example 1.

Example 4

The compositions of a special controlled-release microbial fertilizer for peanuts in a continuous cropping field are the same as those in example 1.

The preparation method is as follows:

(1) adding water whose weight is three times those of sodium carboxymethyl starch and modified starch into sodium carboxymethyl starch and modified starch in the inner layer, heating to 70-80° C., evenly stirring, then adding an inorganic matter, evenly stirring, cooling to room temperature, adding active bacteria and an additive, pelletizing, and drying to obtain a core inner layer;

(2) evenly mixing urea formaldehyde powder, polyethylene glycol and natto powder in the middle layer, heating to 95° C., stirring for 1 h, carrying out ultrasonic treatment for 20 min, cooling to 38° C., spraying the treated middle layer mixed solution on the surface of the core inner layer, rapidly rotating the core inner layer in the process of spraying to obtain double-layer particles; and (3) adding water whose weight is twice those of sodium carboxymethyl starch and modified starch into sodium carboxymethyl starch and modified starch in the inner layer, heating to 70-80° C., evenly stirring, adding the inorganic matter, rice husk carbon and cellulose, evenly stirring, cooling to room temperature, adding the active bacteria and the additive, spraying the above mixed solution on the surface of the double-layer particles prepared in step (2) at room temperature, and then drying the prepared particles under low temperature.

Comparative Example 1

A special controlled-release microbial fertilizer for peanuts in a continuous cropping field: the outer layer and the inner layer are the same as those in example 1, and the difference is that the middle layer only adopts urea formaldehyde powder.

Comparative Example 2

A special controlled-release microbial fertilizer for peanuts in a continuous cropping field: the outer layer and the inner layer are the same as those in example 1, and the difference is that only rice husk carbon is contained.

Comparative Example 3

A special controlled-release microbial fertilizer for peanuts in a continuous cropping field: the outer layer and the inner layer are the same as those in example 1, and the difference is that only cellulose is contained.

Effect Examples (I) 10 g of controlled-release bacterial fertilizers prepared in examples and comparative examples were accurately weighed, put into a gauze bag (100 mesh) and then placed in a beaker, 200 mL of deionized water was added, the above mixture was sealed with a cover and soaked at a constant temperature of 25° C. Sampling time is 1 d, 10 d, 30 d and 50 d. When sampling, the solution in the beaker was evenly shaken, the nutrient dissolution rate (trace elements calcium and magnesium were taken as indexes) of the solution was detected, and finally, the theoretical time of complete nutrient release was counted. The specific test results are shown in Table 1.

TABLE 1

|  | Theoretical time of complete nutrient release (d) |
|---|---|
| Example 1 | 58 |
| Example 2 | 56 |
| Example 3 | 53 |
| Example 4 | 50 |
| Comparative example 1 | 39 |
| Comparative example 2 | 43 |
| Comparative example 3 | 47 |

(II) The same batch of Huayu No. 22 peanut seeds was taken as experimental materials, and the bacterial fertilizers prepared in examples and comparative examples were applied to an experimental field. Three groups of parallel experiments were conducted for each example and comparative example. 25 kg of bacterial fertilizer was applied in each mu. The blank experimental group was set for sowing, and the overall field was a field after continuous peanut cultivation for 2 years. It was sown on May 1 and harvested on September 20. Each group was kept consistent during the sowing soil, field control, fertilizer and water.

Firstly, the incidence of diseases and insect pests in the whole growth cycle was counted. The specific results are shown in Table 2.

TABLE 2

|  | Disease rate (%) | Inset pest rate (%) |
|---|---|---|
| Example 1 | 4.7 | 7.3 |
| Example 2 | 5.1 | 8.2 |
| Example 3 | 3.9 | 6.1 |
| Example 4 | 5.8 | 8.4 |
| Comparative example 1 | 9.3 | 10.3 |
| Comparative example 2 | 6.1 | 8.9 |
| Comparative example 3 | 5.7 | 8.6 |

(III) During test, sowing was carried out for the third year. Before and after planting, soil pH, soil urease activity and soil aeration were detected. The specific results are shown in Table 3 (test results after planting).

TABLE 3

|  | Soil pH | Soil urease activity | Aeration degree (%) |
|---|---|---|---|
| Example 1 | 7.01 | 0.90 | 34.89 |
| Example 2 | 6.89 | 0.86 | 34.98 |
| Example 3 | 6.90 | 0.78 | 33.17 |
| Example 4 | 6.77 | 0.72 | 33.05 |
| Comparative example 1 | 6.31 | 0.64 | 32.36 |
| Comparative example 2 | 6.54 | 0.67 | 31.89 |
| Comparative example 3 | 6.78 | 0.66 | 32.93 |
| Control | 5.24 | 0.43 | 26.01 |

The soil planting experimental field was the same area. Soil samples were randomly selected for pH measurement and the average value was taken. Therefore, the pH before planting was considered to be the same, wherein the soil pH before sowing was 5.41; the soil urease activity was 0.44 mg/kg/h; and the soil aeration degree was 26.12%.

(IV) The yield per plant and yield per unit area were counted. Specific results are shown in Table 4.

TABLE 4

|  | Example 1 | Example 2 | Example 3 | Example 4 | Comparative Example 1 | Comparative Example 2 | Comparative Example 3 | Blank control |
|---|---|---|---|---|---|---|---|---|
| Yield per plant (g) | 50.1 | 48.9 | 49.6 | 43.8 | 41.6 | 42.7 | 43.2 | 37.5 |
| Yield per unit area (kg/6.67 m$^2$) | 6.09 | 5.87 | 5.92 | 5.38 | 4.71 | 5.45 | 5.69 | 4.31 |

The invention claimed is:

1. A controlled-release microbial fertilizer for peanuts in a continuous cropping field, comprising an outer layer, a middle layer and an inner layer; wherein
the inner layer consists of active bacteria, inorganic matter, an additive, 10-15 parts by weight of sodium carboxymethyl starch and 10-20 parts by weight of modified starch, wherein the active bacteria consist of: 200-300 million/g of *Bacillus subtilis,* 100-200 million/g of *Bacillus thuringiensis,* 50-100 million/g of *Aspergillus niger*, and 50-100 million/g of streptomycete with respect to a weight of the inner layer; the inorganic matter consists of: 5-8 parts by weight of calcium nitrate, 1-3 parts by weight of magnesium sulfate, 1-3 parts by weight of zinc sulfate 35, 1-3 parts by weight of borax, 0.5-1 part by weight of ammonium molybdate and 1-3 parts by weight of ferrous sulfate; the additive in the inner layer consists of: 60-80 parts by weight of fulvic acid, 15-20 parts by weight of alginic acid and 10-12 parts by weight of amino acid;
the middle layer is composed of 30-50 parts by weight of urea formaldehyde powder, 15-20 parts by weight of polyethylene glycol and 30-40 parts by weight of natto powder;
the outer layer consists of active bacteria, inorganic matter, and an additive which are the same as the active bacteria, the inorganic matter, and the additive in the inner layer, 10-15 parts by weight of sodium carboxymethyl starch and 10-20 parts by weight of modified starch, and additional 10-12 parts by weight of rice husk carbon as well as 8-10 parts by weight of cellulose.

2. The controlled-release microbial fertilizer according to claim 1, characterized in that the relative molecular weight of the cellulose is 80000-100000.

3. A method for preparing the controlled-release microbial fertilizer according to claim 1, comprising the following steps:
(1) adding water whose weight is three times that of the sodium carboxymethyl starch and the modified starch into the sodium carboxymethyl starch and the modified starch in the inner layer, heating to 70-80° C., evenly stirring, adding the inorganic matter, evenly stirring, cooling to room temperature, adding the active bacteria and the additive, pelletizing, and drying to obtain a core inner layer; and
(2) evenly mixing the urea formaldehyde powder, the polyethylene glycol and ⅓ of the weight of the natto powder in the middle layer, heating to 95° C., stirring for 1 h, then adding the remaining natto powder, evenly stirring, then carrying out ultrasonic treatment for 20 min, cooling to 38° C. to obtain a treated middle layer mixed solution, spraying the treated middle layer mixed solution on a surface of the core inner layer, and rapidly rotating the core inner layer in the process of spraying to obtain double-layer particles; and
(3) adding water whose weight is twice times that of the sodium carboxymethyl starch and the modified starch in the outer layer, heating to 70-80° C., evenly stirring, adding the inorganic matter, rice husk carbon and cellulose, evenly stirring, cooling to the room temperature, adding the active bacteria and the additive to obtain a mixed solution, spraying the above mixed solution on surfaces of the double-layer particles prepared in step (2) at the room temperature, and then drying the sprayed particles under low temperature.

* * * * *